April 25, 1933.  C. K. STROBEL  1,905,525

ELECTRICAL RECTIFIER

Original Filed Sept. 10, 1931

INVENTOR
Charles K. Strobel.
BY
HIS ATTORNEY

Patented Apr. 25, 1933

1,905,525

UNITED STATES PATENT OFFICE

CHARLES K. STROBEL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL RECTIFIER

Original application filed September 10, 1931, Serial No. 562,043. Divided and this application filed November 30, 1932. Serial No. 644,979.

My invention relates to electrical rectifiers, and particularly to rectifiers employing asymmetric units of the metal oxide type.

When a rectifier of the type described is to be used for rectifying small currents, it is necessary, if the rectifier is to be efficient, that the units have a high resistance as well as a good rectifying ratio. One way in which the units can be constructed to provide these desirable features is to make them small in physical size. For example, when the rectifier is to carry several mills of current, a unit one-twelfth of an inch in diameter has been found to be very satisfactory. When the units are made small in size, however, considerable difficulty has been experienced in constructing the rectifier in a manner which will insure good electrical contact with the units, it being necessary in order to obtain good electrical contact, to subject the units to a comparatively high pressure which is distributed substantially uniformly over the units. One object of my present invention is to provide a rectifier assembly which will insure good electrical contact with the small asymmetric units, and which at the same time is easy and economical to manufacture.

The present application is a division of my copending application, Serial No. 562043, filed on Sept. 10, 1931, for electrical rectifiers.

I will describe one form of rectifier embodying my invention, and will then point out the novel features thereof in claims.

Figure 1:
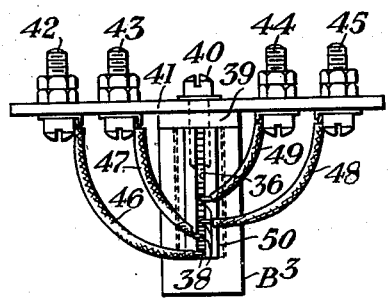
Figure 2:
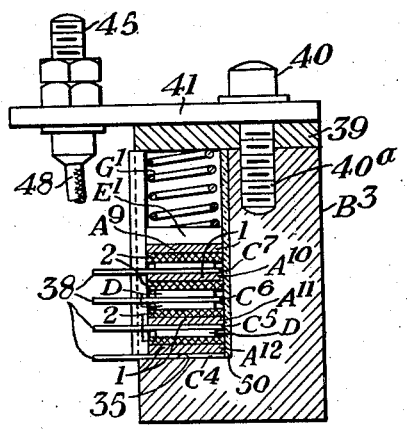

In the accompanying drawing, Fig. 1 is a view showing in front elevation one form of rectifier embodying my invention. Fig. 2 is an enlarged vertical longitudinal sectional view of the rectifier shown in Fig. 1, with some of the parts in elevation to better illustrate the construction of the rectifier.

Similar reference characters refer to similar parts in both views.

Referring to the drawing, the rectifier here shown is of the full-wave type, and comprises four asymmetric units $A^9$, $A^{10}$, $A^{11}$ and $A^{12}$ assembled in a suitable hole 35 in an enclosing member $B^3$. These asymmetric units may be of any suitable type, but in the form here shown, each of these units comprises a flat disk 1 of metal, such as copper, having a coating 2 of a compound of the metal, such as cuprous oxide, formed on one side thereof. Asymmetric units of the type described exhibit the characteristic of offering a higher resistance to current tending to flow from the copper to the oxide than to current tending to flow in the opposite direction through the unit. The enclosing member $B^3$ in the embodiment illustrated is in the form of a rectangular block, and is preferably constructed of brass. It will be readily understood, however, that the enclosing member may have any desired shape and may be constructed of any other suitable metal. The hole 35 extends downwardly from the top of the block to a suitable depth, and has a diameter somewhat larger than the asymmetric units A. The portion of the block adjacent the left-hand side of the hole 35 as viewed in Fig. 2 is provided with a slot 36 (see Fig. 1) which is the same length as the hole 35, and which extends into the hole 35 throughout its length. The sides of the hole 35 and slot 36 are covered by a piece 50 of suitable insulating material, such as paper, which may be glued or otherwise fastened in place. As will be apparent from an inspection of the drawing, in the particular embodiment illustrated, the units $A^{11}$ and $A^{12}$ are assembled in the hole 35 with their coating 2 up, while the units $A^9$ and $A^{10}$ are disposed with their coating 2 down. Interposed between each two adjacent units A, and between the bottom unit $A^{12}$ and the bottom of the hole 35, is a conducting spacer, designated by the reference character C with a suitable distinguishing exponent; and adjacent the coating 2 of each unit is placed an impressionable conducting plate D. Each conducting spacer C is provided with an integral lug 38 which extends outwardly through the slot 36 to facilitate the making of electrical connections with the units. A pressure disk $E^1$ is placed adjacent the metal 1 of the upper unit $A^9$, and interposed between this pressure disk and a metal cover 39 which closes the upper end of the hole 35 is a compressed coil spring $G^1$. The cover 39 is fastened to the block $B^3$ by means of a screw 40 which passes through a suitable clearance hole in the cover, and is threaded into a tapped hole 40ª in the block B³. Also fastened to the block B³ by means of the screw 40 is an insulated terminal board 41 carrying four terminal posts 42, 43, 44 and 45. As will be apparent from an inspection of Fig. 1, the terminal posts 42, 43, 44 and 45 are fastened by means of conductors 46, 47, 48 and 49 with the lugs 38 on the conducting spacers C⁴, C⁵, C⁶ and C⁷, respectively. It will be understood that since the block B³ is metal, the metal side of the unit A⁹ is electrically connected with the conducting disk C⁴ through the medium of the pressure disk E¹, the spring G¹, cover 39 and block B³.

In utilizing the rectifier shown in the drawing, a suitable source of alternating current may be connected with the terminal posts 43 and 44, and the load may be connected with the terminal posts 42 and 45, the terminal post 42 being positive and the terminal post 45 being negative.

It should be pointed out that, while in describing my invention, I have shown only a full-wave rectifier in which each leg of the rectifier consists of a single asymmetric unit, in actual practice the rectifier may be constructed with as many units in series in each leg as are necessary to enable the rectifier to be operated on the desired electro-motive force.

Although I have herein shown and described only one form of electrical rectifier embodying my invention, it is understood that various changes and modifications may be made therein within the scope of the appended claims without departing from the spirit and scope of my invention.

Having thus described my invention, what I claim is:

1. A rectifier comprising a metal block provided with a hole and with a slot which communicates with one side of said hole throughout its length, means for insulating the sides of said hole and said slot, a plurality of asymmetric units in said hole, a plurality of conducting spacers in said hole, one between each two adjacent units and between the bottom of said hole and the adjacent unit and each provided with a lug which extends outwardly through said slot, a pressure disk in said hole adjacent the outer unit, a compression spring having one end engaging the outer side of said pressure disk, and means secured to said block for compressing said spring.

2. A rectifier comprising a metal block provided with a hole and with a slot which communicates with one side of said hole throughout its length, means for insulating the sides of said hole and said slot, a plurality of asymmetric units in said hole, a plurality of conducting spacers in said hole, one between each two adjacent units and between the bottom of said hole and the adjacent unit and each provided with a lug which extends outwardly through said slot, a pressure disk in said hole adjacent the outer unit, a compression spring having one end engaging the outer side of said pressure disk, and a metal cap secured to said block and compressing said spring.

3. A rectifier comprising a metal block provided with a hole and with a slot which communicates with one side of said hole throughout its length, means for insulating the sides of said hole and said slot, a plurality of asymmetric units in said hole, a plurality of conducting spacers in said hole, one between each two adjacent units and between the bottom of said hole and the adjacent unit and each provided with a lug which extends outwardly through said slot, a pressure disk in said hole adjacent the outer unit, a compression spring having one end engaging the outer side of said pressure disk, a metal cap secured to said block for compressing said spring, a terminal board secured to said block, and a plurality of terminal posts carried by said board and each electrically connected with a different one of the lugs on said spacers.

4. A rectifier comprising a metal block provided with a hole which extends part way through said block and with a slot which extends into said hole through one side of the block, a plurality of asymmetric units in said hole each comprising a metal disk having a coating of a compound of the metal formed on one side thereof, said disks being disposed in said hole in such manner that the two disks nearest the inner end of the hole have their metal sides facing toward the inner end of the hole and that the two outer disks have their metal sides facing toward the outer end of the hole, a plurality of conducting spacers in said hole, one disposed between each two adjacent units and between the bottom of the hole and the adjacent unit and each having a lug which extends outwardly through said slot, a plurality of impressionable conducting plates in said hole, one adjacent the coating of each unit, a conducting disk in said hole adjacent the metal side of the outermost unit, a coiled spring in said hole adjacent said conducting disk, a metal cover secured to said block and compressing said spring, an insulating terminal board secured to said block, and a plurality of terminal posts mounted on said terminal board and each connected with the lug on a different one of said spacers.

In testimony whereof I affix my signature.

CHARLES K. STROBEL.